United States Patent [19]

Ryan et al.

[11] Patent Number: 4,674,713
[45] Date of Patent: * Jun. 23, 1987

[54] DOUBLE AIRPLANE SEATS

[75] Inventors: James M. Ryan, New York; Enrique Alie, Brooklyn, both of N.Y.

[73] Assignee: Falcon Jet Corporation, Teterboro, N.J.

[*] Notice: The portion of the term of this patent subsequent to Dec. 2, 2003 has been disclaimed.

[21] Appl. No.: 655,525

[22] Filed: Sep. 28, 1984

[51] Int. Cl.$^4$ .............................................. B64D 11/06
[52] U.S. Cl. .............................. 244/122 R; 244/118.6; 297/330; 297/344
[58] Field of Search ........................ 244/122 R, 118.6; 297/344, 330, 284, 349, 417, 408

[56] References Cited

U.S. PATENT DOCUMENTS

| | | | |
|---|---|---|---|
| 2,201,839 | 5/1940 | Van Hoesen | 297/349 |
| 3,622,202 | 11/1971 | Brown | 297/344 |
| 4,386,803 | 6/1983 | Giderbloom | 297/330 |
| 4,432,583 | 2/1984 | Russo et al. | 297/330 |
| 4,452,485 | 6/1984 | Schuster | 297/284 |
| 4,467,252 | 8/1984 | Takeda et al. | 297/330 |

Primary Examiner—Galen Barefoot
Attorney, Agent, or Firm—Morgan & Finnegan

[57] ABSTRACT

There is disclosed double airplane seats disposed in a side-by-side, inboard and outboard relationship with respect to their disposition in an airplane fuselage. The seats have a common base member provided with a pair of tracks on the bottom thereof which cooperate with a pair of tracks located on the floor of an airplane fuselage and which moves in a fore and aft direction. Fore and aft tracking is located on the top of the outboard portion of the base member and an opening is located in the top inboard portion thereof with a clutch located therein adapted to move universally in fore, aft and lateral directions. A pair of adjustable inboard and outboard seat bases having adjustable back members pivotally joined thereto are located above the base member, the inboard seat base being connected through a shaft to the clutch located in the opening of the base member and the outboard seat base being provided with tracks which cooperate with the tracking located on the top of the outboard portion of the base member, thus permitting movement of the seats independently of the movement of the base member in a fore and aft direction. The seats are provided with a pair of adjustable arm rests, disposed inboard, as well as with adjusting linkage to raise and lower the leading edges of the seat bases, the curvature of the front surfaces of the back members, and the linkage for adjusting the position of the back members and, as well, the necessary controls for achieving the adjustments which are located on the arm rests.

12 Claims, 4 Drawing Figures 4,674,713

DOUBLE AIRPLANE SEATS

BACKGROUND OF THE INVENTION

This invention relates to seat structures. More particularly, the invention relates to seating structures for aircraft.

Due to the unique environment in which they are used, aircraft seat structures must meet a number of requirements. For example, such seat structures must satisfy government requirements involving aircraft safety. In addition, such seat structures must meet relatively rigid weight guidelines in order to provide satisfactory economical operation of an airplane in which they are used while, at the same time, occupying a minimum of space and still providing maximum passenger comfort and convenience.

Due to the peculiar requirements of seating structures employed in aircraft, research and development has resulted in the provision of a wide variety of seating structures suitable for aircraft use. Among such developments are both single and multi-seat structures, such as double seats, for example. British Patent No. 1,237,003 discloses one such double seat for use in aircraft and the particular frame construction therefor. U.S. Pat. No. 2,799,321, on the other hand, discloses a folding double seat for use in an aircraft. In contrast, an energy attenuating seat for use in an aircraft or other vehicles is shown in U.S. Pat. No. 4,440,441, while U.S. Pat. No. 2,871,913 discloses a fore and aft moving double automobile seat and the control therefor. Still another automobile seat construction is disclosed in U.S. Pat. No. 2,627,894.

Multi-aircraft seats are shown in U.S. Pat. No. 2,332,841 which discloses a berth and chair arrangement in which aircraft seats disposed in tandem and having adjustable back and seat members and arm rests are employed in pairs to form berths. In addition, U.S. Pat. No. 1,918,261 discloses a convertable chair with foldable arm rests and a back member which reclines to form a bed or cot. On the other hand, U.S. Pat. No. 2,655,981 discloses an adjustable pilot chair which is movable in a fore and aft direction on a pair of tracks and provided with an adjustable seat, back rest and arm rests. Still another aircraft seat assembly is disclosed in U.S. Pat. No. 3,480,240 in which both fore and aft tracking and lateral tracking are employed in order to change the position of the seat location in the fuselage.

Now, while known prior developments, such as those mentioned above, have enjoyed acceptance in the aircraft industry, there still exists a need for further improvements in seating structures to be employed in airplanes. The present invention fulfills this need.

BRIEF SUMMARY OF THE INVENTION

In accordance with the present invention there is provided double airplane seats disposed in a side-by-side relationship, forming inboard and outboard seats with respect to their disposition in an airplane fuselage and comprising in combination, a common base member having a pair of tracks located on the bottom thereof cooperating with a pair of tracks fixed to the floor of an airplane fuselage and adapted to move in a fore and aft direction, fore and aft tracking means located on the top of the outboard portion of the base member, an opening in the top of the base member located on the inboard portion thereof, means located in the opening adapted to move universally in fore, aft and lateral directions therein, a pair of adjustable, generally horizontally disposed inboard and outboard seat bases located above the base member, a vertically disposed shaft fixed to the bottom of the inboard seat base and to the means located in the opening of the base member adapted to rotate the inboard seat with respect to the base member and permit movement of the inboard seat base universally in fore, aft and lateral directions independently of movement of the base member on the tracks fixed to the floor of the fuselage, fore and aft trackng means located on the bottom of the outboard seat base cooperaitng with the fore and aft tracking means located on the top of the outboard portion of the base member, a pair of adjustable, generally vertically disposed back member cooperatively and pivotally joined to the inboard and outboard seat bases, a pair of arm rests one of which pair is disposed along the adjacent sides of the inboard and outboard seat bases and forward of the back members and the other of which pair is disposed along the inboard side of the inboard seat base, adjusting means located on each of the seat bases adapted to lower and raise the leading edges thereof with respect to their generally horizontal disposition, adjusting means located in each of the back members adapted to adjust the curvature of the front surfaces thereof, means for adjusting the vertical positions of each of the back members with respect to their disposition with the seat bases located on the seat bases and, optionally, at least one adjustable head rest disposed on the uppermost edge of each of the back members.

BRIEF DESCRIPTION OF THE DRAWINGS

In order to understand the present invention more fully, reference is directed to the accompanying Drawings which are to be taken in conjunction with the description of the invention set forth in detail hereinbelow and in which Drawings.

DESCRIPTION OF THE PREFERRED EMBODIMENTS

Figure 1:
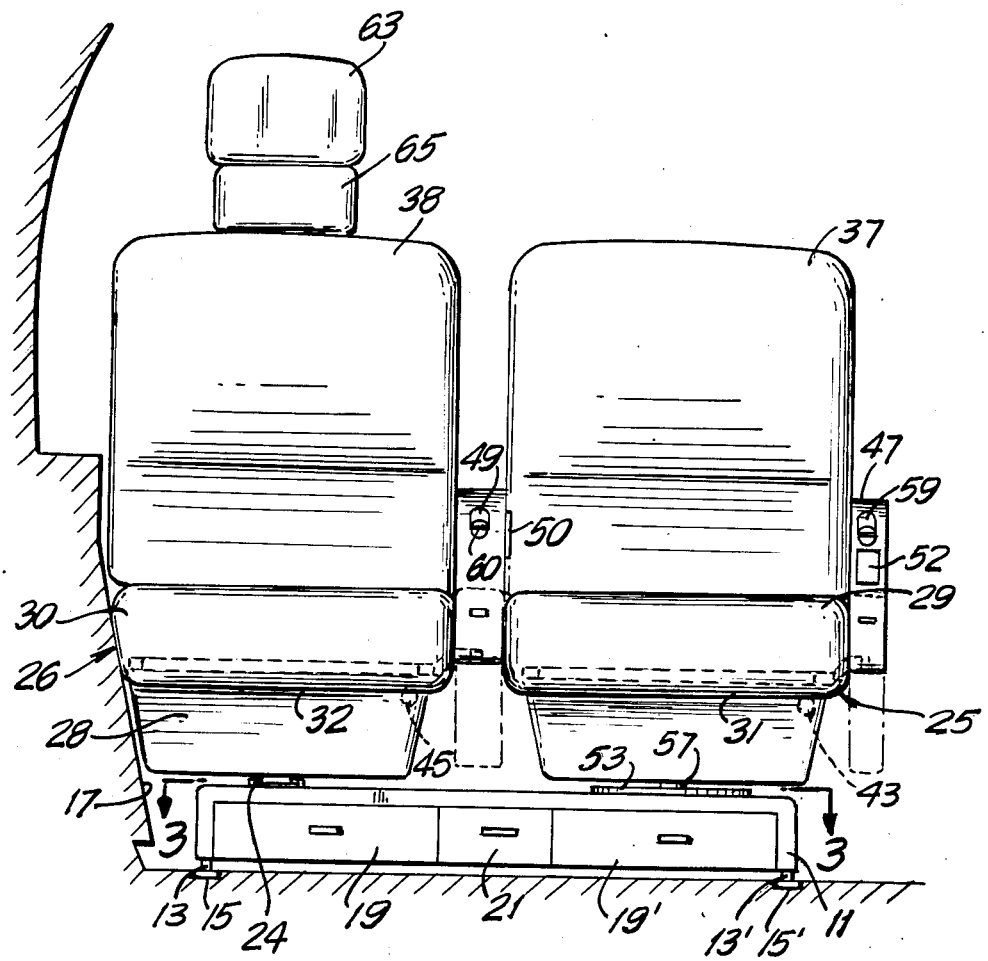
FIG. 1 is a front view in elevation and partially in section of double airplane seats according to the invention showing the inboard and outboard seat bases, back members, common base member and life vest drawers therein, the floor tracking arrangement and floor tracking lever, a pair of adjustable arm rests, the down positions thereof being shown in broken lines and one of which has a single lever control on the front face thereof for actuating the universal fore, aft and lateral movement and the rotation of the inboard seat base and the other of which has a single lever control on the front face thereof for actuating the fore and aft movement of the outboard seat base.
Figure 3:
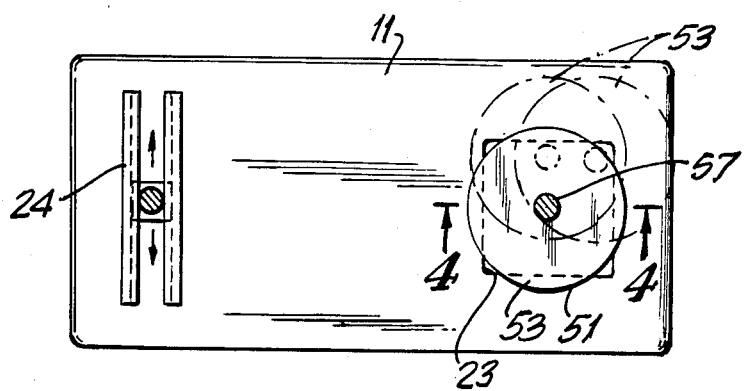
FIG. 3 is a plan view of the common base member, taken across Line 3—3 of FIG. 1, showing the opening therein, the means for achieving universal fore, aft and lateral movement and the vertical shaft, in section, for connecting the inboard seat base and the common base member to each other along with the tracking means for moving the outboard seat base fore and aft.
Figure 2:
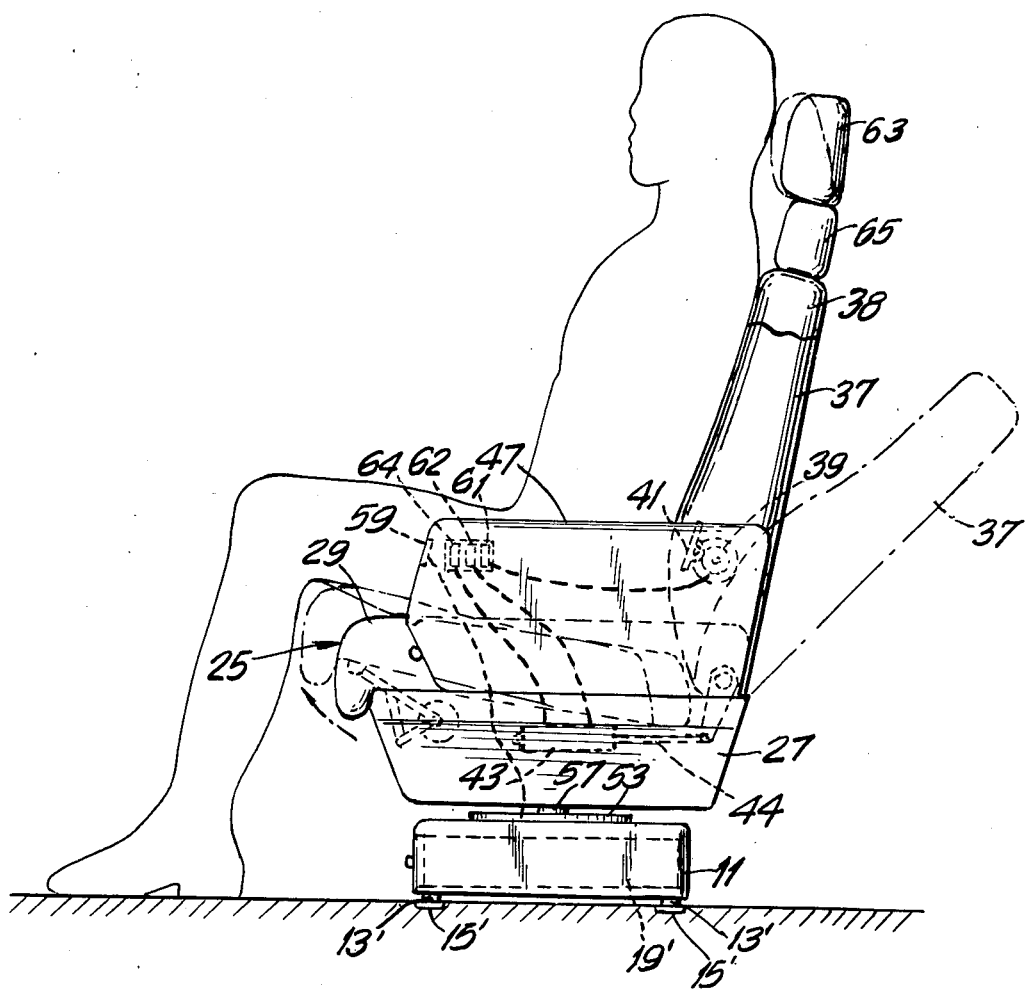
FIG. 2 is a side view of the double seat illustrated in FIG. 1 partially in section showing the inboard seat base in normal disposition and in raised position, in broken lines, along with the adjusting and motor means for raising and lowering the seat base, the back member in normal position and in a partially depressed position, in broken lines, along with the adjusting means and motor means for adjusting the front surface thereof and the switches for actuating the front surface thereof and the switches for actuating the motors located in the arm rest of the seat, as well as the common base member and floor tracking arrangement.

Now, referring more particularly to FIGS. 1 and 2, double airplane seats according to the invention include as part of the overall combination a common base member 11 provided on its bottom with a pair of tracks 13 and 13' or rollers or the like which cooperate with a pair of tracks 15 and 15' fixed to the floor of an airplane fuselage 17 to permit movement of the seat in a fore and aft direction. The tracks are preferably made of strong light-weight metal, such as aluminum or a light gauge steel or alloys thereof of the like. Base member 11 has a generally rectangular configuration and also may be made from aluminum or light gauge steel or alloys thereof or the like and is provided with two drawers 19 and 19' for housing a pair of life vests. The tracks are preferably made in segments about 6 inches long in order to provide a reasonable fore and aft movement of the double airplane seats. Tracks provided on the base member may be made of like length. Base member 11 is also provided with a suitable floor tracking lever 21 located on the front face thereof between the drawers 19 and 19'. Lever 21 locks the common base member 11 in a given position and when actuated permits fore and aft movement of the base. An opening 23 and fore and aft tracking means 24, shown in greater detail in FIG. 3 and described more fully hereinbelow, along with their associated elements, are located on the top of common base member 11.

Located over common base member 11 is a pair of adjustable generally horizontally disposed inboard and outboard seat bases 25 and 26, respectively, provided with generally rectangular lower support members 27 and 28 and body supporting members 29 and 30 which are adapted to be raised and lowered along their leading edges 31 and 32 by means of a motor such as 33 and suitable mechanical means such as 35 fixed to lower support member 27 and attached to the bottom of the body support member 29, as illustrated for the inboard seat base 25 in FIG. 2, thus providing thigh adjustments for individuals employing the seats. It will be appreciated in this respect that like elements are provided for the outboard seat base 26. Seat bases 25 and 26 are supported on a suitable seat frame (not shown) employed in the art and which is made of a strong, lightweight metal, such as those mentioned above, and a pair of adjustable generally vertically disposed back members 37 and 38 also are pivotally supported on the frame and thus cooperatively joined to the seat bases 25 and 26.

Back members 37 and 38 are provided with a motor means such as 39 and suitable mechanical adjusting means such as 41 associated with back member 37 in FIG. 2, for adjusting the curvatures of the front surfaces thereof, thus providing lumbar support to individuals employing the seats. It will be appreciated in this respect that like elements are provided for the other back member 38. While the lumbar adjustments may be widely varied in terms of the amount or distance of the adjustments of the curvature of the surfaces of back members 37 and 38, studies have determined a 1.25 inch high adjustment is generally adequate to provide sufficient lumbar support to an individual of average height, that is in the range of about 5.5 feet to about 6.0 feet. In addition, back members 37 and 38 may also be provided with hydraulic means, such as 43, associated with back member 37 and appropriate mechanical linkage 44 supported on the seat base, or even on the frame, if desired, so that the back members can be conveniently adjusted to an intermediate, or a fully reclining position if desired, thus converting the seats of this invention to a berth of cot. In this connection, a suitable hydraulic means, such as 45, associated with back member 38, which may be employed, is a seat lock sold by the P. L. Porter Company of Woodland Hills, Calif., 91637, under the registered trade name Hydrolok. Moreover, while the backs of the double airplane seats of this invention can be made to adjust to fully reclining positions, they are preferably made to adjust to an angle of abour 45° from their upright positions.

Double airplane seats according to this invention are also provided with a pair of arm rests 47 and 49. Both arm rests may be attached to the seats in any conveniently suitable manner. However, it is preferred that both of the arm rests be adjustable vertically, the vertical movement thereof being accomplished by appropriate tracking which may be disposed on the interior of the inboard side of arm rests 47 and located on the inboard side of the inboard seat base 25 and forward of back member 37 and may be mounted for vertical movement on pins (not shown) which may be fixed to the seat and also locked in their up or down positions by appropriate locking means (not shown). Arm rest 49 which is located along the adjacent sides of the inboard and outboard seat bases 25 and 26 may be mounted in a similar manner. In accordance with this invention, arm rest 49 is preferably about 3 inches wide to provide support for individuals using both seats and is also provided with an interior compartment for housing an electrocardigram unit. Access to the electrocardigram unit by an individual using the inboard seat is easily attained through a sliding door 50 located on the inboard side of arm rest 49. Arm rest 47, on the other hand, is approximately 2 inches wide and may be provided with convenience items, such as an ashtray 52.

Figure 4:
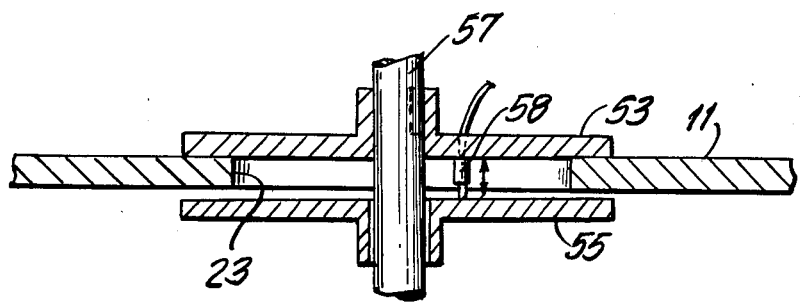
FIG. 4 is a partial view in elevation and in section taken across Line 4—4 of FIG. 3 showing in detail the common base member and the opening therein and the means for achieving univeral fore, aft and lateral movement.

Inboard seat base 25 is adapted to move universally in fore, aft and lateral directions independently of the fore and aft movement of common base member 11. In order to accomplish such universal, independent movement of inboard seat base 25 in accordance with this invention, as well as to provide a physical link between inboard seat base 25 and common base member 11, there is provided clutch means 51 adapted to move universally in fore, aft and lateral directions in the opening 23 of common base member 11, as may be seen more particularly in FIGS. 3 and 4. Clutch means 51 is provided with clutch plates 53 and 55 disposed just above and just below opening 23.

Clutch plates 53 and 55 are mounted on one end of a vertically extending shaft 57 which is fixed at its opposite end to the bottom of the lower support member 27 of inboard seat base 25. Clutch plates 53 and 55 are keyed to shaft 57 so that they move axially thereon and are provided with means, such as springs (not shown) to hold them in an engaged position against the upper and lower surfaces of the top of common base member 11, thus preventing universal fore, aft and lateral movement of clutch means 51 in opening 23 and universal movement of the seat. At the same time, the seat is prevented from swiveling or rotating. In addition, means 58 such as Hydrolok hydraulic means 45, mentioned above, may be attached in any convenient manner to clutch plates 53 and 55 and, when actuated, move the clutch plates, respectively in a downward direction and an upward direction against the urging of the springs mentioned above and away from the upper and lower surfaces of common base member 11, thus allowing universal movement in fore, aft and lateral directions of clutch means 51 in opening 23, as well as permitting the seat of this invention to undergo movement in these directions and at the same time to be rotated or swiveled approximately 180° from its usual front-facing position in an aircraft fuselage, all such movements being independent of any fore and aft movement of the common base member 11.

It is to be understood that in accordance with this invention the clutch plates 53 and 55 are made in sufficient dimensions so that they will not pass through opening 23 of common base member 11 when they are undergoing universal movement in fore, aft and lateral directions. In this respect, it is also to be understood that the dimensions of opening 23 of common base member 11 will also be made conveniently large enough so that the greatest fore and aft distance of movement is preferably about 6 inches and the greatest lateral distance of movement is preferably about 5 inches.

On the other hand, outboard seat base 26 is adapted to move fore and aft on fore and aft tracks 24 independently of the fore and aft movement of common base member 11 and the universal movement in fore, aft and lateral directions of the inboard seat base 25.

It is to be understood that it is also within the purview of this invention to utilize limiting stops or dead end means (not shown) of any convenient kind to limit the fore and aft and lateral movements of the common base member and the inboard and outboard seat bases of the double airplane seats of this invention.

In accordance with this invention, the arm rests are conveniently used for housing the various controls utilized to accomplish the movement in fore, aft and lateral directions of inboard seat base 25, as well as the swiveling or rotation thereof and the fore and aft movement of the outboard seat base 26. In this respect, such movements, as well as swiveling or rotation of the inboard seat of the double airplane seats of this invention are accomplished hydraulically through a single lever control 59 disposed preferably on the forward face of the left arm rest, that is, arm rest 47 and forward and aft movement of outboard seat base 26 through a single lever control 60 disposed preferably on the forward face of arm rest 49. In addition, the inclination of the back members of double airplane seats according to this invention is controlled by a single control lever 61 located on the outboard face of the left arm rest 47 and control of the motorized lumbar adjustment of the front surface of the back member 37, as well as the raising and lowering of the leading edge of the seat base 25 is controlled through suitably disposed switches 62 and 64 located on the outboard side of arm rest 47. It will be appreciated that like controls are located on the inboard face or side of arm rest 49 for accomplishing the same purpose with the outboard seat.

It is to be understood further that in accordance with this invention double airplane seats may also optionally include removable adjustable head rests such as shown at 63, along with an optional removable spacers such as shown at 65, located on the uppermost edges of the back members.

Still further, double airplane seats in accordance with this invention will be equipped with seat belts (not shown) which may be attached thereto in any convenient manner in order to meet required government safety regulations.

The unique combination of the above elements of double airplane seats in accordance with this invention also includes a wide variety of aesthetic acoutrements. For example, the seats may be provided with a wide variety of light-weight and comfortable padding, either of foam material or fabric material or other types of padding and in their complete assembly may be covered with a wide variety of decorative fabrics to provide a pleasing aesthetic appearance, as well as to coordinate with seats in terms of color or shade with the overall color scheme of an aircraft in which the seats are employed.

The double airplane seats of this invention, due to their unique combination of structural elements, provide numerous advantages. For example, the seats may be made, in part, from light-weight metals, such as high strength aluminum and light guage steel or alloys thereof which will meet the stringent requirements for safety and security requried by the Government in aircraft and all of which are available through normal commercial channels. In addition, the various adjustable means may also be made from such materials and light-weight long-life motors to drive the same are readily available through normal commercial channels.

Still further, because of the unique combination of parts and the unique construction of the seats in accordance with this invention, the main elements of the inboard seat of the double airplane seats can be moved universally in fore, aft and lateral directions and the main elements of the outboard seat can be moved fore and aft independently of the fore and aft movement of the base structure thereof.

Still further, double airplane seats, in accordance with this invention, are readily adaptable to a wide variety of asethetic effects since they may employ a wide variety of readily commercially available paddings and fabric coverings to achieve such effects.

In addition to those various advantages above mentioned double airplane seats according to this invention provide maximum convenience and comfort to passengers employing the same, while at the same time meeting government safety requirements Numerous other advantages of double airplane seats in accordance with this invention will be readily apparent to those skilled in the art.

It is to be understood that this invention, in its broader aspects, is not to be limited to the specific embodiments thereof as herein shown and described, but departures may be made therefrom within the scope of the appended claims without departing from the principles of the invention and without sacrificing the chief advantages thereof.

What is claimed is:

1. Double airplane seats disposed in a side-by-side relationship, forming inboard and outboard seats with respect to their disposition in an airplane fuselage and comprising in combination, a common base member having a pair of tracks located on the bottom thereof cooperating with a pair of tracks fixed to the floor of said airplane fuselage and adapted to move in a fore and aft direction, fore and aft tracking means located on the top of the outboard portion of said base member, an opening in the top of said base member located on the inboard portion thereof, clutch means located in said opening adapted to move universally in fore, aft and lateral directions therein, a pair of adjustable, generally horizontally disposed inboard and outboard seat bases located above said base member, a vertically disposed shaft fixed to the bottom of said inboard seat base and to said clutch means located in said opening and adapated to rotate said inboard seat with respect to said base member and permit movement of said inboard seat base universally in fore, aft and lateral directions independently of the movement of said base member on the tracks fixed to the floor of said fuselage, said clutch means including clutch plates disposed on opposite sides of the opening in said base member and which are keyed on said shaft to axial movement thereon and into and out of contact with the upper and lower surfaces of the top of said base member when in engaged and disengaged positions, respectively, fore and aft tracking means located on the bottom of said outboard seat base cooperating with said fore and aft tracking means located on the top of the outboard portion of said base member, a pair of adjustable, generally vertically disposed back members cooperatively and pivotally joined to said inboard and outboard seat bases, a pair of arm rests, one of which pair is disposed along the adjacent sides of said inboard and outboard seat bases and forward of said back members and the other of which pair is diposed along the inboard side of said inboard seat base, adjusting means located on each of said seat bases adapted to lower and raise the leading edges thereof with respect to their generally horizontal dispostion, adjusting means located in each of said back members adapted to adjust the curvature of the front surfaces thereof, and means for adjusting the vertical positions of each of said back members with respect to their disposition with said seat bases located on said seat bases.

2. Double airplane seats according to claim 1 including a floor tracking lever for moving the base member fore and aft along the pair of tracks fixed to the floor of the airplane fuselage.

3. Double airplane seats according to claim 1 including a pair of drawers located in the base member for housing a pair of life vests.

4. Double airplane seats according to claim 1 including motor means for actuating each of the adjusting means adapted to lower and raise the leading edges of each of the seat bases.

5. Double airplane seats according to claim 1 including motor means for actuating each of the adjusting means located in the back members to adjust the curvature of the front surfaces thereof.

6. Double airplane seats according to claim 1 including a single lever control disposed on the forward face of the arm rest located on the inboard side of the inboard seat base for actuating the universal fore, aft and lateral movement and rotation of said seat base with respect to said base member and a single lever control located on the forward face of the arm rest disposed along the adjacent sides of the inboard and outboard seat bases for actuating the fore and aft movement of the outboard seat base.

7. Double airplane seats according to claim 1 including control means disposed on the outboard sides of each of the arm rests for actuating the adjusting means located on the inboard and outboard seat bases to lower and raise the leading edges thereof and for actuating the adjusting means located in the back members to adjust the curvature of the front surfaces thereof.

8. Double airplane seats according to claim 1 including a compartment in the arm rest disposed along the adjacent sides of the inboard and outboard seat bases for housing an electrocardigram unit, said compartment being provided with a sliding door opening towards the inboard seat.

9. Double airplane seats according to claim 1 in which the pair of arm rests are adjustable in a vertical direction.

10. Double airplane seats according to claim 1 in which the means for adjusting the vertical positions of each of the back members is a hydraulically operated means and the control means therefor is located on the outboard sides of the pair of arm rests.

11. Double airplane seats according to claim 1 in which the fore and aft movement of the outboard seat base may be accomplished independently of any fore and aft movement of the common base member and any universal movement in fore, aft and lateral directions of the inboard seat base.

12. Double airplane seats according to claim 1 including at least one adjustable head rest disposed on the uppermost edge of each of the back members.

* * * * *